3,669,725
FLAMEPROOFING OF POLYESTER-CELLULOSE FIBRE MATERIALS

Hermann Nachbur, Dornach, Joerg Kern, Oberwil, Basel-Land, and Arthur Maeder, Therwil, Switzerland, assignors to Ciba Limited, Basel, Switzerland
No Drawing. Filed Mar. 26, 1970, Ser. No. 24,391
Claims priority, application Switzerland, Mar. 31, 1969, 4,858/69
Int. Cl. C09d 5/18, 3/28
U.S. Cl. 117—136
12 Claims

ABSTRACT OF THE DISCLOSURE

A process for the flameproofing of mixed fiber materials of polyester and cellulose is provided in which an aqueous preparation is applied to these materials, which contains a reaction product of a nitrogen compound, a phosphonopropionic acid amide, formaldehyde and optionally an alkanol. Afterwards the materials are dried and subjected to a heat treatment. The fiber materials then have a very good permanent flame resistance. Preferred fiber materials are polyester-cotton mixed fabrics.

---

The subject of the invention is a process for the flameproofing of mixed fibre materials of polyester and cellulose, characterised in that an aqueous preparation is applied to these materials which contains (a) at least one reaction product of (a') a nitrogen compound which can be at least dimethylolated, (b') a compound of formula (1) 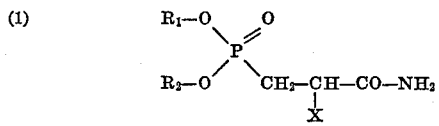

wherein $R_1$ and $R_2$ each denote an alkyl, alkenyl or halogen-alkyl radical with at most 4 carbon atoms and X denotes a methyl radical or preferably a hydrogen atom, (c') formaldehyde or a formaldehyde-releasing agent and (d') optionally, an alkanol with at most 4 carbon atoms, and (b) at least one aliphatic or aromatic polyhalogenated phosphoric acid triester, preferably a phosphoric acid trialkyl or triaryl ester, and that the materials treated in this way are dried and subjected to a heat treatment.

The reaction products (a) used for the process according to the invention can be obtained by reaction of the components (a'), (b'), (c') and (d') in the most diverse sequences. For example, the components (a'), (b') and (c') can first be reacted simultaneously with one another and thereafter optionally be further etherified with the component (d').

Another possibility consists of allowing the component (a') to react with the component (c'), then with the component (b') and thereafter optionally with the component (d'). The reaction products (a) can further be obtained by reaction of the component (a') with the component (c'), then with the component (d') and thereafter with the component (b'). Further, such reaction products (a) are obtained if firstly the components (a') and (b') are each separately reacted with the component (c') and the two reaction products are then reacted with one another and thereafter optionally further reacted with the component (d'). Furthermore it is also possible first to react the component (b') with the component (c') and optionally with the component (d') and then to allow the product thus produced to react with the component (a').

Suitable nitrogen compounds which can be at least dimethylolated [=component (a')] are compounds which can be converted by addition of formaldehyde into so-called curable aminoplast precondensates. The following may be mentioned: 1,3,5-aminotriazines such as N-substituted melamines, for example N-butylmelamine, as well as ammeline, guanamines, for example formoguanamine, benzoguanamine, acetoguanamine or also diguanamines. Further possibilities are also: biuret, guanidine, thiourea, alkylureas or arylureas and alkylthioureas or arylthioureas, alkyleneureas or alkylenediureas, for example ethyleneurea, propyleneurea or acetylenediurea; 4,5-dihydroxy-imidazolidone-2 and derivatives thereof, for example the 4,5-dihydroxyimidazolidone-2 which is substituted in the 4-position, at the hydroxyl group, by the radical —CH$_2$CH$_2$CO—NH—CH$_2$—OH. Further possibilities are also cyclic nitrogen compounds, for example of formulae

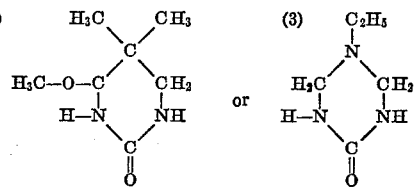

However 1,3,5-triazines which are substituted by at least two primary amino groups, urea and the compound of formula (2) are preferred. Melamine is of particular interest.

Preferably, the component (b') corresponds to the formula (4) 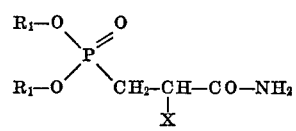

wherein $R_1$ and X have the indicated significance.

Components (b') which correspond to the formula (5) 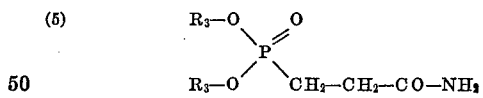

wherein $R_3$ denotes an ethyl or methyl radical are of particular interest.

Amongst the compounds of Formula 5, 3-(dimethylphosphono)-propionic acid amide has proved particularly advantageous.

Reaction products of hexamethylolmelamine or hexamethylolmelamine-pentamethyl-ether and 3-(dimethylphosphono)-propionic acid amide and optionally formaldehyde have above all proved to be very suitable components (a) in the process according to the invention.

Other preferred components (a) are reaction products of dimethylolmelamine or hexamethylolmelamine and 3-(dimethylphosphono)-propinonic acid methylolamine.

The reaction products (a) can furthermore also correspond to the formula (6)
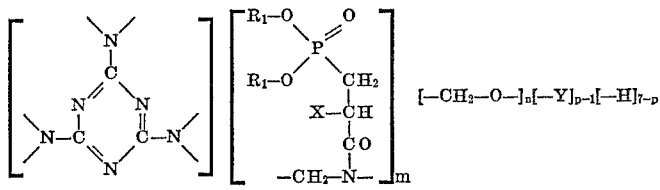

wherein $R_1$ and $X$ have the indicated significance, $Y$ denotes an alkyl group with at most 4 carbon atoms, and $m$, $n$ and $p$ each denote a positive integer, with $m$ having a value of 4 to 6, $n$ a value of 3 or 4 and $p$ a value of at most $n+1$. For example, such a product can be compound of Formula 7

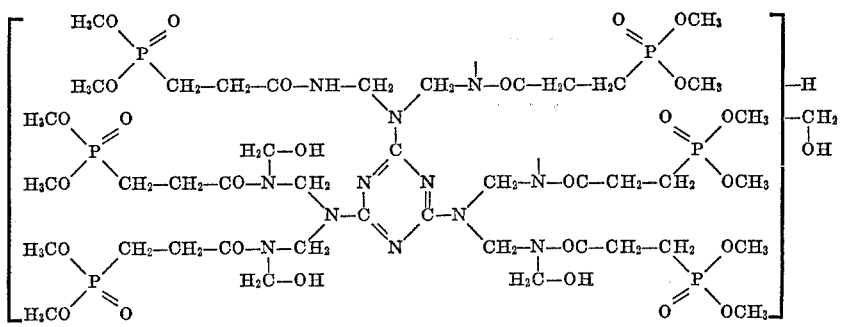

Other reaction products (a) can for example correspond to the formula (8)
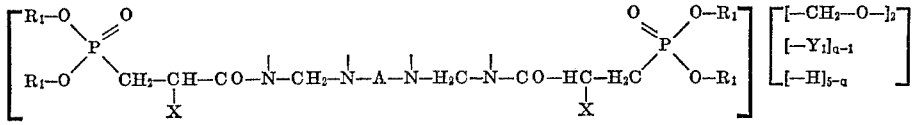

wherein $R_1$ and $X$ have the indicated significance, $A$ represents a —CO—, CS—, CNH— or —CO—NE—CO radical, wherein E represents a hydrogen atom or a radical of formula —CH$_2$—O—Y$_1$ denotes an alkyl radical with at most 4 carbon atoms or preferably a hydrogen atom and $q$ denotes 1, 2 or 3. A possible compound is here for example the compound of formula (9)
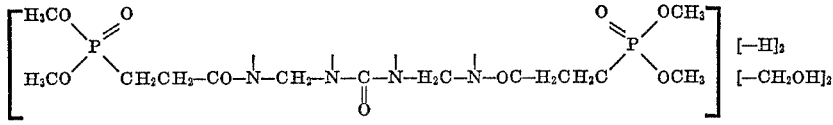

Further suitable reaction products (a) are described in British patent specification 1,092,793, as is their manufacture.

The reaction products (a) of Formula 6 are appropriately obtained if a compound of Formula 1 is condensed with 1,3,5-triazine containing at least two primary amino groups, with the H$_2$N— groups of one of these two starting components having to be methylolated, with warming, preferably in the presence of an organic solvent which forms an azeotrope with water, post-methylolated with formaldehyde or a formaldehyde-releasing agent at elevated temperature, optionally in the presence of a basic catalyst, and optionally subsequently further etherified with an alkanol containing at most 4 carbon atoms.

The reaction products (a) which correspond to the Formula 8 are appropriately manufactured by mono-methylolating two mols of a compound of Formula 1 with two mols of formaldehyde or a formaldehyde-releasing agent, subsequently reacting with one mol of urea, thiourea, guanidine or biuret in the absence of water, in an inert organic solvent at elevated temperature, post-methylolating the resulting reaction product with formaldehyde or a formaldehyde-releasing agent at elevated temperature, optionally in the presence of a basic catalyst, and optionally further etherifying with an alkanol with at most 4 carbon atoms.

The post-methylolations with formaldehyde or a formaldehyde-releasing agent such as paraformaldehyde are advantageously carried out at temperatures of up to 150° C. Possible catalytically active base which are conjointly used are, for example, sodium hydroxide, potassium hydroxide, sodium acetate, magnesium carbonate or magnesium oxide.

A preferred embodiment for the manufacture of the reaction products (a) consists of reacting a compound of Formula 1 with a methylolated optionally etherified component (a') in the melt, that is to say in the absence of a solvent, at temperatures of 100 to 150° C.

The component (b) can be a single polyhalogenated triester of phosphoric acid or a mixture of such esters.

Polyhalogenated phosphoric acid trialkyl esters are preferably used as component (b). In particular, those trialkyl esters are suitable which contain at most 4 carbon atoms in the alkyl radical and wherein each alkyl radical is substituted with 2 or 3 halogen atoms, for example bromine or chlorine atoms. Specifically, tris-(2,3-dibromo-2-chloropropyl)-phosphate or especially tris-(2,3-dibromopropyl)-phosphate may here be mentioned as component (b). In addition, however, triaryl esters such as tris-(polybromaromatic) phosphates, for example polybrominated triphenyl phosphate or tricresyl phosphate, may also be mentioned.

The aqueous preparations for the flameproofing of polyester-cellulose fibre materials as a rule contain 15 to 40 percent by weight of the component (a) and 5 to 25 percent by weight of the component (b). The aqueous preparations are obtained by simple mixing of the components (a) and (b) and addition of an appropriate amount of water. In the undiluted state, the mixtures of the components (a) and (b) are viscous, and on dilution with water finely disperse emulsions of good stability result.

The preparations of flameproofing can optionally contain yet further additives. In order to achieve a greater deposition of material on fabrics it is for example advantageous to add 0.1 to 0.5‰ of a high molecular polyethylene glycol. The customary plasticisers can furthermore be added to the preparations. If the creaseproof property of the fabric to be treated is to be improved at the same time, it is for example possible to add aminoplast precondensates to the preparations. An addition of curing catalysts, such as for example ammonium chloride, ammonium dihydrogen orthophosphate, phosphoric acid, magnesium chloride, zinc nitrate is also possible but not necessary in most cases since the reaction products to be used according to the invention mostly cure of their own accord at higher temperatures. The addition of an emulsifier is frequently unnecessary since the phosphorus-containing reaction products (a) are in part themselves very effective emulsifiers for the polyhalogenated phosphoric acid esters.

The fibre materials to be provided with a flameproof finish in accordance with the invention are preferably textiles. In particular, polyester-cellulose mixed fabrics are used, with the ratio of the polyester constituent to the cellulose constituent being 1:4 to 2:1. Thus, for example, so-called 20/80, 26/74, 50/50 or 67/33 polyester-cellulose mixed fabrics can be used.

The preparations are now applied to the mixed fibre materials of polyester and cellulose, and this can be done in a manner which is in itself known. Preferably, piece goods are used and these are impregnated on a padder of the customary construction, which is charged with the preparation at room temperature. The cellulose constituents of mixed fibre materials can originate from natural or regenerated cellulose, for example linen, cotton, rayon or viscose staple.

The fibre material impregnated in this way now has to be dried and this is appropriately done at temperatures of up to 100° C. It is thereafter subjected to a heat treatment at temperatures above 100° C., for example between 130 and 200° C., preferably at 140 to 180° C., the duration of which can be the shorter the higher is the temperature. This duration of heating is for example 2 to 6 minutes at temperatures of 180 to 140° C.

A rinse with an acid-binding agent, preferably with aqueous sodium carbonate solution, for example at 40° C. to the boiling point and for 40 to 3 minutes is desirable in the case of a strongly acid reaction medium.

Fibre materials having a very good permanent flame resistance are obtained according to the process of the invention.

The percentages and parts in the examples which follow are percentages by weight and parts by weight respectively. The relationship of parts by volume to parts by weight is as of ml. to g.

Manufacturing instructions (A) 181 parts (1 mol) of 3-(dimethylphosphono)-propionic acid amide are fused in a 500 parts by volume stirring flask equipped with a reflux condenser and thermometer, and warmed to 120° C. internal temperature whilst stirring. Thereafter 83.6 parts of hexamethylolmelamine-pentamethyl-ether (0.2 mol) are added, the internal temperature is again adjusted to 120° C., and the mixture is stirred for a further 15 minutes, in the course of which the internal temperature gradually drops to 100° C. and a distinct reflux of methanol is simultaneously formed. This methanol is advantageously not removed, in order to keep the viscosity of the reaction mixture in a range where it can still be easily handled.

The reaction product A has reached the desired degree of condensation when a sample of about 2.5 parts, mixed with 1.5 parts of tris-(2,3-dibromopropyl)-phosphate and stirred manually in a test tube with 6 parts of water immediately produces a finely disperse milky emulsion. The reaction product is thereafter cooled to room temperature, or can, before cooling, be mixed with the desired amount of tris-2,3-dibromopropyl-phosphate and cooled simultaneously.

In both cases a highly viscous product is obtained which on mixing with water shows a strongly acid reaction.

(B) 220 parts of 96% strength 3-(dimethylphosphono)-propionic acid methylolamide (1 mol) are mixed with 23.25 parts of dimethylolmelamine (0.125 mol) in a 500 parts by volume stirring flask equipped with a reflux condenser and thermometer, and warmed to 125° C. internal temperature whilst stirring. After 10 minutes stirring at this temperature gelling occurs, after which 50 parts of water are added and stirred into the gel whilst simultaneously cooling to room temperature. A gelatine-like product of 80% solids content is obtained.

(C) 220 parts of 96% strength 3-(dimethylphosphono)-propionic acid methylolamide (1 mol) are mixed with 51 parts of hexamethylolmelamine (0.17 mol) in a 500 ml. stirring flask equipped with a reflux condenser and thermometer, and warmed to 110–115° C. internal temperature whilst stirring. Thereafter the methanol constituents contained in the 3-(dimethylphosphono)-propionic acid methylolamide are removed in vacuo over the course of 5 minutes. Subsequently the material is treated for 30 minutes at 125° C. internal temperature and then cooled to room temperature.

A very highly viscous colourless and clear product is obtained.

(D) 724 parts of 3-(dimethylphosphono)propionic acid amide and 306.4 parts of hexamethylolmelamine are suspended in 1000 parts of benzene in a stirring flask of 2500 parts by volume capacity, equipped with a water separator. 9.6 parts of p-toluenesulphonic acid are further added and the mixture is heated to the boiling point of the benzene, in the course of which the water formed during the condensation is removed azeotropically and collected in the water separator. After 20 hours reaction time no further water is formed. 74 parts of water (calculated, 73 parts) are obtained. The benzene is thereafter removed in vacuo and 400 parts of water are simultaneously gradually added dropwise.

400 parts of 40% strength aqueous formaldehyde are added to the cloudy solution which is left and methylolation carried out for 4 hours at 60° C. A pH-value of 8 to 8.5, which is continuously monitored with a pH-electrode, is maintained by means of dropwise addition of a total of 14.5 parts of 30% strength sodium hydroxide solution. After cooling to room temperature, 1640 parts of an opalescent solution are obtained, which remains coludy even after a filtration. The content of active substance is 62%. The following formaldehyde values are found: total $CH_2O$: 188 parts (of this, 68 parts of $CH_2O$ originate from the hexamethylolmelamine and 120 parts are employed for the methylolation). Free $CH_2O$: 58 parts. Bonded $CH_2O$: 130 parts.

It can thus be assumed that 62 parts of $CH_2O$ are bonded to the secondary —CONH— groups through the methylolation, which corresponds to a tetramethylol compound of the following formula:

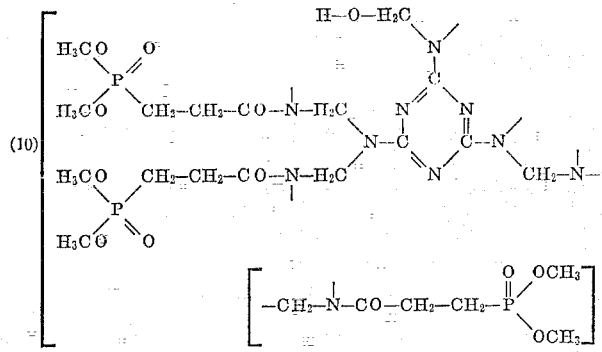

(10)

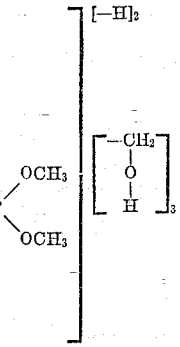

(E) 211 parts of 3-(dimethylphosphono)propionic acid methylolamide (1 mol) are mixed with 93.5 parts of benzoguanamine (0.5 mol) in a 500 parts by volume stirring flask equipped with a reflux condenser and thermometer, and reacted for 30 minutes at 120 to 125° C. internal temperature. A clear syrup is obtained, which after cooling solidifies to a white paste.

(F) 186 parts (0.08 mol) of 3-(dimethylphosphono)-propionic acid methylolamide are reacted with 96 parts (0.44 mol) of a compound of formula (11)

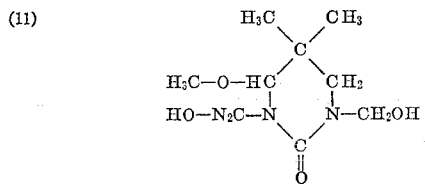

in the apparatus described in Instruction E, for 2 hours at 115 to 120° C. internal temperature. A yellow syrup is obtained.

(G) 271.5 parts (1.5 mol) of 3-(dimethylphosphono)-propionic acid amide, 31.5 parts (0.25 mol) of melamine, 46.2 parts (1.5 mol) of 96.5% strength paraformaldehyde and 9 parts of a 27% strength methanolic solution of Na methylate are reacted in the apparatus described in Instruction E for 30 minutes at 100° C. internal temperature. After cooling, 100 parts of water and 160 parts of isopropanol are added, and the resulting solution is freed of traces of insoluble constituents by filtration. Thereafter the water-isopropanol mixture is removed in vacuo at 60° C. and a practically clear viscous syrup is obtained.

(H) 217.2 parts (1.2 mol) of 3-(dimethylphosphono)-propionic acid amide and 61.2 parts (0.2 mol) of hexamethylolmelamine are reacted for 30 minutes at 100 to 105° C. in the apparatus described in Instruction E. After cooling, 160 parts of methanol and 100 parts of water are added, and the resulting solution is freed of small amounts of insoluble constituents by filtration, with the addition of 5 parts of kieselguhr. Thereafter the water-methanol mixture is removed in vacuo at 60° C. and a highly viscous, colourless, opal-cloudy resin is obtained.

(I) 316.5 parts (1.5 mols) of 3-(dimethylphosphono)-propionic acid methylolamide and 76.5 parts (0.25 mol) of hexamethylolmelamine are treated in the same manner as in Instruction H. A highly viscous colourless resin is again obtained.

(J) 271.5 parts (1.5 mols) of 3-(dimethylphosphono)-propionic acid amide and 90 parts (0.75 mol) of dimethylurea are reacted in the apparatus described in Instruction E for 30 minutes at 125 to 130° C. A clear syrup is obtained, which after cooling solidifies to give a white paste.

(K) 316.5 parts (1.5 mols) of 3-(dimethylphosphono)-propionic acid methylolamide and 75 parts (0.75 mol) of propyleneurea are reacted in the apparatus described in Instruction E for 1 hour at 120 to 130° C. A yellowish syrup of low viscosity is obtained.

(L) 211 parts (1 mol) of 3-(dimethylphosphono)-propionic acid methylolamide and 93 parts (0.5 mol) of guanidine carbonate of 97% purity are reacted in the apparatus described in Instruction E for 90 minutes at 100° C. During the reaction, an evolution of $CO_2$ occurs, which is complete after the above-mentioned reaction time. A yellowish, highly viscous syrup is obtained.

(M) 110 parts of the reaction product described in Instruction H are dissolved in 110 ml. of methanol at 20° C. in a four-necked stirring flask of 200 parts by volume capacity, equipped with a reflux condenser, thermometer, gas inlet tube and pH-electrode, and HCl gas is passed in whilst stirring until the pH is 2.5. Thereafter etherification is carried out for 3½ hours at reflux temperature (72–73° C.) and the pH is kept at 2.5 to 3.2. Subsequently the mixture is cooled to 60° C. and neutralised with anhydrous sodium carbonate until pH 7.9 is reached, and the reaction solution is cooled to 20° C. and filtered through a filter paper. The filtrate is again freed of methanol in vacuo at 60° C. A highly viscous, slightly cloudy syrup is obtained.

(N) 210 parts (0.5 mol) of a 45% strength aqueous solution of a triazone of formula (12)

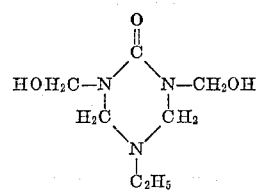

and 200 parts of benzene are heated to the boil in a stirring flask of 500 parts by volume capacity, equipped with a water separator as well as with a reflux condenser and thermometer, and the water is removed azeotropically. 122 parts of water are obtained. Thereafter the benzene is removed in vacuo. The reaction product contains 18.5 parts of $CH_2O$. 130 parts of 3-(dimethylphosphono)-propionic acid methylolamide are now added, this amount being equivalent to the $CH_2O$ found, and the mixture is treated for 1 hour at 125 to 135° C. After cooling, the reaction product is a yellowish solid mass.

(O) 139 parts (0.5 mol) of bis-(2-chlorethylphosphono)-propionic acid amide and 35.5 parts (0.25 mol) of hexamethylolmelamine - pentamethyl - ether (90% strength) are reacted in the apparatus described in Instruction E for 70 minutes at 100 to 110° C. A syrupy reaction product is obtained.

(P) 116.5 parts (0.5 mol) of 3-(diallylphosphono)-propionic acid amide, 15.4 parts (0.5 mol) of 97.5% strength paraformaldehyde, 1.75 parts of Na methylate powder and 0.23 part of hydroquinone are reacted in the apparatus described in Instruction E for 75 minutes at 100 to 110° C. The resulting product has a degree of methylolation of 88%.

35.5 parts (0.25 mol) of a 90% strength hexamethylolmelamine-pentamethyl ether are now added and the mixture is treated for a further 60 minutes at 115 to 120° C. After cooling, a yellowish syrup is obtained.

(Q) 152.5 parts (0.25 mol) of a 43% strength aqueous solution of tetramethylolacetylenediurea of formula (13)

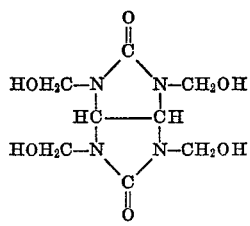

and 211 parts (1 mol) of 3-(dimethylphosphono)-propionic acid methylolamide are warmed in the apparatus described in Instruction E to 140° C. external temperature and the water is distilled off in vacuo. In the course of this the internal temperature rises from 60° to 125° C. in 25 minutes and is kept at 125° C. for 2 hours.

After cooling, a yellowish syrup is obtained.

(R) 225 parts (1 mol) of 3-(dimethylphosphono)-methoxymethylpropionic acid amide and 51 parts (0.166 mol) of hexamethylolmelamine are reacted in the apparatus described in Instruction E for 15 minutes at 118 to 119° C. and subsequently immediately cooled to room temperature. A colourless syrup is obtained.

(S) 132.5 parts (0.5 mol) of 4-(di-n-butylphosphono)-propionic acid amide, 15.5 parts (0.5 mol) of 97.5% strength paraformaldehyde and 1.7 parts of Na methylate powder are reacted in the apparatus described in Instruction E for 90 minutes at 100° C. The resulting product has a degree of methylolation of 77%. 35.5 parts (0.25 mol) of a 90% strength hexamethylolmelamine-pentamethyl ether are now added and the mixture is treated for a further 60 minutes at 115 to 120° C. After cooling, a colourless syrup is obtained.

(T) 150 parts of the resin described in Instruction I are etherified with methanol in an analogous manner to that described in Instruction M. A viscous syrup is obtained.

(U) 211 parts (1 mol) of 3-(dimethylphosphono)-propionic acid methylolamide and 71 parts (0.166 mol) of a 90% strength hexamethylolmelamine-pentamethyl ether are reacted in the apparatus described in Instruction E for a total of 50 minutes at 118 to 125° C. After the end of the first 30 minutes reaction time the apparatus is placed under vacuum and the resulting methanol is distilled off. This treatment is carried out for a further 20 minutes, after which the material is immediately cooled to room temperature. A colourless, clear, viscous syrup is obtained.

(V) The procedure described in Instruction U is followed, but after completion of the distillation of methanol the mixture is only cooled to 100° C. and the reaction product is mixed with 220 parts of tris-2,3-dibromopropyl phosphate and now cooled slowly to room temperature with continued stirring. A yellowish, almost clear and homogeneous, viscous product is obtained.

(W) The procedure described in Instruction V is followed but the tris-2,3-dibromopropyl phosphate is relaced by the same amount of weight of tris-(2-cholo-2,3-dibromopropyl)phosphate. A highly viscous, homogeneous product is obtained.

(X) Manufacture of tris-(2-chloro-2,3-dibromopropyl) phosphate.— 9 g. of bromine and 20 g. of carbon tetrachloride are introduced into a three-neck flask equipped with a thermometer, stirrer and dropping funnel. This mixture is slowly cooled to about 10° C. with ice water and the slow dropwise addition of 5 g. tris-(2-chlorallyl) phosphate is then started, care being taken that the temperature does not rise. The introduction requires about 15 minutes. The mixture is left to stand for 12 hours. The solution, which is coloured deep brown-red, is warmed by means of hot water. To remove the excess bromine and the HBr which may be formed, nitrogen is blown in vigorously. Thereafter the mixture is concentrated in vacuo. A slightly coloured viscous oil is obtained, which crystallises throughout after some time. It is almost analytically pure.

Yield: 13.5 g.=96.5% of theory.

EXAMPLE 1

40 parts of a mixture obtained by mixing 250 parts of the reaction product A with 150 parts of tris-2,3-dibromopropyl phosphate are emulsified manually in 55 parts of water and the emulsion is mixed with 5 parts of an 0.5% strength aqueous solution of a polyethylene glycol of molecular weight $10^6$. The use of a homogenisation apparatus should be avoided since otherwise the polyethylene glycol loses the effect of imparting a higher receptivity for the emulsion to the fabric.

An undyed 50:50 polyester-cotton fabric (200 g./m.$^2$ fabric weight) is padded with this emulsion and dried at 80 to 100° C. Thereafter curing is effected for 4½ minutes at 160° C. and the material rinsed for 30 minutes at 40° C. with a detergent solution which contains 5 g./l. of a fine detergent based on soap (similar to SNV–95811 wash). Before washing, the fabric possesses a coating of material of 24% of its original weight, whilst after the wash 21% coating of material are still found. The handle of the treated fabric is only slightly affected and the flame resistance according to the AATCC test method 23–1966 (vertical flame test with 12 seconds ignition time) is very good.

EXAMPLE 2

An undyed 67:33 polyester-cotton fabric (180 g./m.$^2$ fabric weight) is treated in the same manner as described in Example 1. Before washing according to Example 1, the fabric possesses a coating of material of 27.5% of its original weight, whilst after the wash 23.5% coating of material are still found. The handle of the treated fabric is only slightly affected and the flame resistance according to AATCC test method 23–1966 must be described as good.

EXAMPLE 3

468 parts of the gelatinous condensation product B are mixed with 225 parts of tris-2,3-dibromopropyl phosphate and 370 parts of water in a homogenisation apparatus to give a finely disperse emulsion (=total 1000 parts of finishing bath), which has a pH-value of 5 to 6. An undyed 50:50 polyester-cotton fabric (200 g./m.$^2$ fabric weight) is padded with this emulsion and dried at 80 to 100° C. Thereafter curing is effected for 4½ minutes at 160° C. and the material is rinsed for 30 minutes at 40° C. in a detergent solution which contains 5 g./l. of a fine detergent based on soap (similar to SNV–95811 wash). Before washing, the fabric possesses a coating of material of 40% of its original weight, whilst after the wash 30% coating of material are still found. The handle of the treated fabric is only slightly affected and the flame resistance according to the AATCC test method 23–1966 is very good.

EXAMPLE 4

375 parts of the condensation product C are mixed with 225 parts of tris-2,3-dibromopropyl phosphate and 20 parts of 85% strength phosphoric acid and this mixture is treated with 380 parts of water in a homogenisation apparatus to give a finely disperse emulsion (=total 1000 parts of finishing bath). The pH-value of this finishing bath is 1 to 2.

An undyed 50:50 polyester-cotton fabric (200 g./m.$^2$ fabric weight) is padded with this emulsion and dried at 80 to 100° C. Thereafter curing is effected for 4½ minutes at 150° C. and the material rinsed for 30 minutes at 60° C. in a detergent solution as described in Example 1.

Before this rinse the fabric possesses a coating of material of about 40%, whilst after the wash 30% coating are still found. The handle of the treated fabric is only slightly affected and the flame resistance according to the AATCC test method 23-1966 is very good. If the wash described above is repeated four more times, the flame resistance continues to be good.

EXAMPLE 5

520 parts of the condensation product D, containing 62% of active substance, are mixed with 188 parts of tris-2,3-dibromopropyl phosphate and 2 parts of 85% strength phosphoric acid and this mixture is treated with 290 parts of water in a homogenisation apparatus to give an emulsion (=total 1000 parts of finishing bath).

An undyed 50:50 polyester-cotton fabric (200 g./m.$^2$ fabric weight) is padded with this emulsion and dried at 80 to 100° C. Thereafter curing is effected for 4½ minutes at 150° C. and the material rinsed for 30 minutes at 60° C. as described in Example 3. Before this rinse the fabric has a coating of material of 42%, and afterwards of 31%. The handle of the treated fabric is only slightly affected and the flame resistance according to the AATCC method 23-1966 is very good. After a further 4 washes the effect is still good.

EXAMPLE 6

An undyed 50:50 polyester-cotton fabric is padded with the liquors I to X of Table I below and dried at 80 to 100° C. Thereafter curing is effected for 4½ minutes at 160° C.

The individual pieces of fabric are then tested for their flame resistance (vertical test DIN-53906, 12 seconds ignition time. The results of this test are also summarised in Table I.

EXAMPLE 7

An undyed 50:50 polyester-cotton fabric is padded with the liquor XI to XV of Table II below and dried at 80 to 100° C. Thereafter curing is effected for 4½ minutes at 160° C.

A part of the fabric is rinsed for 5 minutes in a detergent solution which contains 4 g./l. of sodium carbonate and 2 g./l. of a condensation product of 1 mol of p-tert.-nonylphenol and 9 mols of ethylene oxide.

The individual pieces of fabric are then tested for their flame resistance (vertical test DIN 53906, ignition time 12 seconds). The results of this test are also summarised in Table II.

TABLE II

| Constituents (g./l.): | Untreated | Treated with liquor |  |  |  |  |
|---|---|---|---|---|---|---|
|  |  | XI | XII | XIII | XIV | XV |
| Product according to— |  |  |  |  |  |  |
| Instruction E | | | | | | 175 |
| Instruction F | | 320 | | | | |
| Instruction G | | | 360 | | | |
| Instruction I | | | | 400 | | |
| Instruction O | | | | | 520 | |
| Instruction U | | | | | | 225 |
| Tris-2,3-dibromopropyl phosphate | 260 | 310 | 310 | 310 | 310 | 225 |
| Emulsifier $^1$ | | 50 | 50 | 50 | 50 | |
| Copolymer $^2$ | 50 | 50 | 50 | 50 | 50 | 60 |
| H$_3$PO$_4$ (85%) | | 30 | 30 | 30 | 30 | |
| Phosphorus | 42 | 61 | 61 | 60 | 55 | |
| Bromine | 180 | 214 | 214 | 214 | 214 | 155 |
| Flame resistance: | | | | | | |
| Before rinsing: | | | | | | |
| Burning time (sec.) Burns | 0 | 0 | 0 | 0 | 0 | 0 |
| Tear length (cm.) | 12.5 | 11 | 13 | 10 | 12.5 | |
| After rinsing: | | | | | | |
| Burning time (sec.) Burns | 0 | 0 | 0 | 0 | 0 | 0 |
| Tear length (cm.) | | 14 | 12 | 8.5 | 11.5 | 13 |

Footnotes 1 and 2, see Example 6.

EXAMPLE 8

An undyed 50:50 polyester-cotton fabric is padded with liquors XVI to XX of Table III below and dried at 80 to 100° C. Thereafter curing is effected for 4½ minutes at 160° C.

TABLE I

| Constituents (g./l.): | Untreated | Treated with liquor |  |  |  |  |  |  |  |  |
|---|---|---|---|---|---|---|---|---|---|---|
|  |  | I | II | III | IV | V | VI | VII | VIII | IX | X |
| Product according to— |  |  |  |  |  |  |  |  |  |  |  |
| Instruction E | 120 | | | | | | | | | | |
| Instruction H | | 355 | | | | | | | | | |
| Instruction J | | | 370 | | | | | | | | |
| Instruction K | | | | 470 | | | | | | | |
| Instruction L | | | | | 435 | | | | | | |
| Instruction M | | | | | | 355 | | | | | |
| Instruction N | | | | | | | 555 | | | | |
| Instruction Q | | | | | | | | 420 | | | |
| Instruction S | | | | | | | | | 560 | | |
| Instruction T | | | | | | | | | | 425 | |
| Instruction U | 180 | | | | | | | | | | |
| Tris-2,3-dibromopropyl phosphate | 180 | 310 | 310 | 310 | 310 | 310 | 310 | 310 | 310 | 310 | |
| Emulsifier $^1$ | | 50 | 50 | 50 | 50 | 50 | 50 | 50 | 50 | 50 | |
| Copolymer $^2$ | 60 | 50 | 50 | 50 | 50 | 50 | 50 | 50 | 50 | 50 | |
| H$_3$PO$_4$ (85%) | | 30 | 30 | 30 | 30 | 30 | 30 | 30 | 30 | 30 | |
| P | 42 | 16 | 61 | 60 | 60 | 60 | 60 | 60 | 60 | 60 | |
| Br | 124 | 214 | 214 | 214 | 214 | 214 | 214 | 214 | 214 | 214 | |
| Flame resistance: | | | | | | | | | | | |
| Burning time (sec.) Burns | 0 | 0 | 0 | 0 | 0 | 0 | 0 | 0 | 0 | 0 | |
| Tear length (cm.) | 12.5 | 12 | 12 | 12 | 10 | 9 | 10 | 11 | 9.5 | 10 | |

$^1$ Emulsifier: condensation product of 1 mol of hydroabietyl alcohol and 200 mols of ethylene oxide, cross-linked with 1% of hexamethylenediisocyanate, as a 50% strength aqueous solution.
$^2$ Copolymer: of 55% of vinyl acetate, 40% n-butyl acrylate and 5% N-diethylaminopropylacrylamide, quaternised with chloracetamide, as a 40% strength aqueous solution.

A part of the woven fabric is rinsed for 5 minutes in a detergent solution which contains 4 g./l. of sodium carbonate and 2 g./l. of a condensation product of 1 mol of p-tert.-nonylphenol and 9 mols of ethylene oxide.

A further part of this woven fabric is now washed 5 times for 30 minutes at 60° C. in a solution which contains 2 g. of anhydrous sodium carbonate and 5 g. of soap per litre of water (=SNV-3 wash). The individual pieces of fabric are then tested for their flame resistance (vertical test DIN 53906, 12 seconds ignition time). The results of this test are also summarised in Table III below.

EXAMPLE 11

An undyed 26:74 polyester-cotton fabric is padded with the liquors VII, IX, XV and XIX of Examples 6, 7 and 8 and dried at 80 to 100° C. Thereafter curing is effected for 4½ minutes at 160° C.

TABLE III

|  | Untreated | Treated with liquor | | | | |
|---|---|---|---|---|---|---|
|  |  | XVI | XVII | XVIII | XIX | XX |
| Constituents (g./l.): |  |  |  |  |  |  |
| Product according to— |  |  |  |  |  |  |
| Instruction P | | 505 | | | | |
| Instruction R | | | 420 | | | |
| Instruction V | | | | 700 | | |
| Instruction W | | | | | 700 | 700 |
| Tris-2,3-dibromopropyl phosphate | | 310 | 310 | | | |
| Emulsifier [1] | | 50 | 50 | | 90 | |
| Copolymer [2] | | 50 | 50 | 50 | 75 | 50 |
| $H_3PO_4$ (85%) | | 30 | 30 | 30 | | |
| Phosphorus | | 60 | 60 | 61 | 55 | 55 |
| Bromine | | 214 | 214 | 214 | 62 | 62 |
| Chlorine | | | | | 13 | 13 |
| Flame resistance: |  |  |  |  |  |  |
| Before rinsing: |  |  |  |  |  |  |
| Burning time (sec.) | Burns | 0 | 0 | 0 | 0 | 0 |
| Tear length (cm.) | 10.5 | 8 | 10.5 | 12.5 | 11 | |
| After rinsing: |  |  |  |  |  |  |
| Burning time (sec.) | Burns | 0 | 0 | 0 | 0 | 0 |
| Tear length (cm.) | 11.5 | 11 | 10 | 11.5 | 11 | |
| After 5×SNV-3: |  |  |  |  |  |  |
| Burning time (sec.) | Burns | 0 | 0 | 0 | 53 | 59 |
| Tear length (cm.) | 12 | 10 | 11 | 13.5 | 15 | |

Footnotes 1 and 2, see Example 6.

EXAMPLE 9

An undyed 50:50 polyester-cotton fabric is padded with the liquor XXI of Table IV below and dried at 80 to 100° C. Thereafter curing is effected for 4½ minutes at 160° C.

A part of the fabric is rinsed for 5 minutes in a detergent solution which contains 4 g./l. of sodium carbonate and 2 g./l. of a condensation product of 1 mol of p-tert.-nonylphenol and 9 mols of ethylene oxide.

A further part of this fabric is now washed 5 times or 10 times, for 30 minutes at 60° C. in a solution which contains 2 g. of anhydrous sodium carbonate and 5 g. of soap per litre of water (=SNV-3 wash).

The individual pieces of fabric are then tested for their flame resistance (vertical test DIN 53906, 12 seconds ignition time). The results of this test are also summarised in Table IV.

TABLE IV

|  | Untreated | Treated with liquor, XXI |
|---|---|---|
| Constituents (g./l.): |  |  |
| Product according to Instruction G | | 450 |
| Tris-2,3-dibromopropyl phosphate | | 360 |
| Copolymer [2] | | 75 |
| P | | 60 |
| Br | | 250 |
| Flame resistance: |  |  |
| Before rinsing: |  |  |
| Burning time (seconds) | Burns | 0 |
| Tear length (cm.) | | 10 |
| After rinsing: |  |  |
| Burning time (seconds) | Burns | 0 |
| Tear length (cm.) | | 11 |
| Plus after 5 × SNV-3: |  |  |
| Burning time (seconds) | Burns | 0 |
| Tear length (cm.) | | 11 |
| Plus after 10 × SNV-3: |  |  |
| Burning time (seconds) | Burns | 0 |
| Tear length (cm.) | | 9.5 |

Footnote 2, see Example 6.

EXAMPLE 10

An undyed 26:74 polyester-cotton fabric is padded with liquor I from Example 6 and dried at 80 to 100° C. Thereafter curing is effected for 4½ minutes at 160° C.

The piece of fabric is then tested for its flame resistance (vertical test DIN 53906, ignition time 12 seconds). The fabric does not burn and has a tear length of 12.5 cm.

A part of the fabric is rinsed for 5 minutes in a detergent solution which contains 4 g./l. of sodium carbonate and 2 g./l. of a condensation product of 1 mol of p-tert.-nonylphenol and 9 mols of ethylene oxide.

A further part of this fabric is now washed 5 times for 30 minutes at 60° C. in a solution which contains 2 g. of anhydrous sodium carbonate and 5 g. of soap per litre of water (=SNV-3 wash).

The individual pieces of fabric are then tested for their flame resistance (vertical test DIN 53906, ignition time 12 seconds). The results of this test are summarised in Table V below.

TABLE V

| Flame resistance | Untreated | Treated with liquor | | | |
|---|---|---|---|---|---|
|  |  | VII | IX | XIX | XV |
| Before rinsing: |  |  |  |  |  |
| Burning time (sec.) | Burns | 0 | 0 | 0 | 0 |
| Tear length (cm.) | 9 | 7.5 | 11 | 12.5 | |
| After rinsing: |  |  |  |  |  |
| Burning time (sec.) | Burns | 0 | 0 | 0 | 0 |
| Tear length (cm.) | 9 | 8.5 | 11 | 13 | |
| After 5 × SNV-3: |  |  |  |  |  |
| Burning time (sec.) | Burns | 0 | 0 | 59 | |
| Tear length (cm.) | 11.5 | 11 | 14 | | |

EXAMPLE 12

An undyed 26:74 polyester-cotton fabric is padded with liquors II to VI, VIII, X to XIV, XVI to XVIII, XX and XXI from Examples 6 to 9 and dried at 80 to 100° C. Thereafter curing is effected for 4½ minutes at 160° C.

A part of the fabric is rinsed for 5 minutes in a detergent solution which contains 4 g./l. of sodium carbonate and 2 g./l. of a condensation product of 1 mol of p-tert.-nonylphenol and 9 mols of ethylene oxide.

A further part of this fabric is now washed 5 times or 10 times, for 30 minutes at 60° C. in a solution which contains 2 g. of anhydrous sodium carbonate and 5 g. of soap per litre of water (=SNV-3 wash).

The individual pieces of fabric are then tested for their flame resistance (vertical test DIN 53906, 12 seconds ignition time). The results of this test are summarised in Table VI below.

TABLE VI

| Flame resistance | Untreated | II | III | IV | V | VI | VIII | X | XI | XII | XIII | XIV | XVI | XVII | XVIII | XX | XXI |
|---|---|---|---|---|---|---|---|---|---|---|---|---|---|---|---|---|---|
| Before rinsing: | | | | | | | | | | | | | | | | | |
| Burning time (sec.) Burns | 0 | 0 | 0 | 0 | 0 | 0 | 0 | 0 | 0 | 0 | 0 | 0 | 0 | 0 | 0 | 0 | 0 |
| Tear length (cm.) | 9.5 | 9.5 | 9 | 9 | 8.5 | 8.5 | 8 | 9.5 | 10 | 10 | 8 | 9.5 | 7 | 8 | 9 | 10 | |
| After rinsing: | | | | | | | | | | | | | | | | | |
| Burning time (sec.) Burns | 0 | 0 | 0 | 0 | 0 | 0 | 0 | 0 | 0 | 0 | 0 | 0 | 0 | 0 | 0 | 0 | 0 |
| Tear length (cm.) | 10.5 | 10 | 9 | 9 | 8.5 | 9.5 | 8.5 | 10 | 8 | 7 | 8 | 9 | 8.5 | 7.5 | 10 | 11 | |
| After 5×SNV-3: | | | | | | | | | | | | | | | | | |
| Burning time (sec.) Burns | 0 | 0 | 0 | 0 | 0 | 0 | 0 | 0 | 0 | 0 | 0 | 0 | 0 | 0 | 0 | 0 | 0 |
| Tear length (cm.) | 10.5 | 8 | 11 | 11 | 9 | 10 | 7.5 | 9 | 9 | 8 | 10 | 8 | 9 | 8 | 7.5 | 11 | |
| After 10×SNV-3: | | | | | | | | | | | | | | | | | |
| Burning time (sec.) Burns | 0 | 0 | 0 | 0 | 0 | 0 | 0 | 0 | 0 | 0 | 0 | 0 | 0 | 0 | 0 | 0 | 0 |
| Tear length (cm.) | 11.5 | 8.5 | 8.5 | 13 | 9 | 11 | 7 | 9.5 | 10.5 | 8.5 | 12 | 10.5 | 9.5 | 10 | 9 | 9.5 | |

We claim:

1. Process for the flameproofing of mixed fiber materials of polyester and cellulose which comprises impregnating said materials with an aqueous preparation comprising:
   (a) a reaction product comprising
      (1) a nitrogen compound which can be at least dimethylolated,
      (2) a compound of the formula $$\begin{array}{c} R_1-O \\ \phantom{R_1-}\diagdown \\ \phantom{R_1-O}P=O \\ \phantom{R_1-}\diagup \phantom{P}\diagdown \\ R_2-O \phantom{==} CH_2-CH-CO-NH_2 \\ \phantom{R_2-O CH_2-}| \\ \phantom{R_2-O CH_2-}X \end{array}$$

wherein $R_1$ and $R_2$ each is alkyl, alkenyl or halogenalkyl with at most 4 carbon atoms and X is methyl or hydrogen, and
      (3) formaldehyde or a formaldehyde-releasing agent
   which reaction product (a) is unetherified or etherified with an alkanol containing at most 4 carbon atoms, and
   (b) an aliphatic or aromatic polyhalogenated phosphoric acid triester,
   drying said treated materials and thereafter subjecting said treated materials to a heat treatment.

2. Process according to claim 1 wherein component (1) is a 1,3,5-triazine substituted by at least two primary amino groups, or urea.

3. Process according to claim 1, wherein component (1) is melamine.

4. Process according to claim 1, wherein component (2) is a compound of the formula $$\begin{array}{c} R_1-O \\ \phantom{R_1-}\diagdown \\ \phantom{R_1-O}P=O \\ \phantom{R_1-}\diagup \phantom{P}\diagdown \\ R_2-O \phantom{==} CH_2-CH-CO-NH_2 \\ \phantom{R_2-O CH_2-}| \\ \phantom{R_2-O CH_2-}X \end{array}$$

5. Process according to claim 1, wherein component (2) is a compound of the formula $$\begin{array}{c} R_3-O \\ \phantom{R_3-}\diagdown \\ \phantom{R_3-O}P=O \\ \phantom{R_3-}\diagup \phantom{P}\diagdown \\ R_3-O \phantom{==} CH_2-CH_2-CO-NH_2 \end{array}$$

wherein $R_3$ is ethyl or methyl.

6. Process according to claim 1, wherein component (2) is a 3-(dimethylphosphono)-propionic acid amide.

7. Process according to claim 1, wherein the reaction product (a) comprises of hexamethylolmelamine or hexamethylolmelaminepentamethyl ether, 3-(dimethylphosphono)-propionic acid amide, and formaldehyde.

8. Process according to claim 1, wherein the reaction product (a) comprises of dimethylolmelamine or hexamethylolmelamine, 3-(dimethylphosphono)-propionic acid methylolamide, and formaldehyde or a formaldehyde-releasing agent.

9. Process according to claim 1, wherein the component (b) is a polyhalogenated phosphoric acid trialkyl ester.

10. Process according to claim 9, wherein the alkyl radicals of the polyhalogenated phosphoric acid trialkyl ester contain at most 4 carbon atoms and each alkyl radical is substituted by 2 or 3 halogen atoms.

11. Process according to claim 9, wherein component (b) is tri-(2,3-dibromo-2-chloropropyl)-phosphate or tris-(2,3-dibromopropyl)-phosphate.

12. A fiber material of polyester-cellulose containing an effective amount of a flameproof finish which compises of a mixture of
   (a) a reaction product comprising
      (1) a nitrogen compound which can be at least dimethylolated,
      (2) a compound of the formula $$\begin{array}{c} R_1-O \\ \phantom{R_1-}\diagdown \\ \phantom{R_1-O}P=O \\ \phantom{R_1-}\diagup \phantom{P}\diagdown \\ R_2-O \phantom{==} CH_2-CH-CO-NH_2 \\ \phantom{R_2-O CH_2-}| \\ \phantom{R_2-O CH_2-}X \end{array}$$

wherein $R_1$ and $R_2$ each is alkyl, alkenyl or halogenalkyl with at most 4 carbon atoms and X is methyl or hydrogen, and
      (3) formaldehyde or a formaldehyde-releasing agent which reaction product (a) is unetherified or etherified with an alkanol containing at most 4 carbon atoms, and
   (b) an aliphatic or aromatic polyhalogenated phosphoric acid triester.

References Cited
UNITED STATES PATENTS 3,381,063  4/1968  Zahir _____ 260—937
2,662,834  12/1953  Paist et al. _____ 117—136 X WILLIAM D. MARTIN, Primary Examiner T. G. DAVIS, Assistant Examiner U.S. Cl. X.R.

117—138.8 F, 143 A, 145; 106—15 FP; 260—29.4 R

PO-1050
(5/69)

UNITED STATES PATENT OFFICE
CERTIFICATE OF CORRECTION

Patent No. 3,669,725            Dated June 13, 1972

Inventor(s) HERMANN NACHBUR ET AL

It is certified that error appears in the above-identified patent and that said Letters Patent are hereby corrected as shown below:

Column 1, line 6, delete "CIBA LIMITED" and substitute --- CIBA-GEIGY AG ---

Signed and sealed this 16th day of April 1974.

(SEAL)
Attest:

EDWARD M. FLETCHER, JR.
Attesting Officer

C. MARSHALL DANN
Commissioner of Patents